United States Patent
Nakamura

(10) Patent No.: US 11,162,712 B2
(45) Date of Patent: Nov. 2, 2021

(54) SOLAR LIGHT UTILIZATION APPARATUS AND SOLAR LIGHT UTILIZATION SYSTEM

(71) Applicant: YAZAKI ENERGY SYSTEM CORPORATION, Tokyo (JP)

(72) Inventor: Takuju Nakamura, Tokyo (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 164 days.

(21) Appl. No.: 16/589,058

(22) Filed: Sep. 30, 2019

(65) Prior Publication Data

US 2020/0033028 A1 Jan. 30, 2020

Related U.S. Application Data

(63) Continuation of application No. PCT/JP2018/012613, filed on Mar. 27, 2018.

(30) Foreign Application Priority Data

Apr. 3, 2017 (JP) .............................. JP2017-073447

(51) Int. Cl.
*F24S 10/40* (2018.01)
*F24S 23/77* (2018.01)
(Continued)

(52) U.S. Cl.
CPC ............... *F24S 10/45* (2018.05); *F24S 23/77* (2018.05); *F24S 23/80* (2018.05); *F24S 70/30* (2018.05); *H02S 40/22* (2014.12)

(58) Field of Classification Search
CPC ............ F23S 23/77; F23S 23/80; F23S 23/70; F24S 20/63; Y02E 10/50; Y02B 10/20; H02S 10/50

See application file for complete search history.

(56) References Cited

U.S. PATENT DOCUMENTS 3,915,148 A * 10/1975 Fletcher .................. F24S 50/40
126/591
4,108,540 A * 8/1978 Anderson .......... G02B 19/0042
359/726

(Continued)

FOREIGN PATENT DOCUMENTS

CN 105143932 A 12/2015
EP 1 376 026 A2 1/2004
(Continued)

*Primary Examiner* — David J Laux
*Assistant Examiner* — Nikhil P Mashruwala
(74) *Attorney, Agent, or Firm* — Kenealy Vaidya LLP

(57) ABSTRACT

Provided is a solar collector that captures and utilizes solar energy and includes a plurality of vacuum tubes which are disposed by extending horizontally and are disposed parallel to each other with a predetermined distance; and a reflection plate having a substantially planar shape, which reflects solar light on an opposite side of the sun with respect to the plurality of vacuum tubes, in which the reflection plate includes a reflection surface having a serrated section at a corresponding position between vacuum tubes adjacent to each other, and in the reflection surface, one face of a serration forms a first reflection surface that reflects the solar light to the vacuum tube on a lower side among the vacuum tubes adjacent to each other.

6 Claims, 3 Drawing Sheets

(51) Int. Cl.
*F24S 23/70* (2018.01)
*F24S 70/30* (2018.01)
*H02S 40/22* (2014.01)

(56) References Cited

U.S. PATENT DOCUMENTS

| | | | |
|---|---|---|---|
| 4,222,807 A * | 9/1980 | Farber | F24S 10/502 |
| | | | 156/244.13 |
| 4,287,882 A * | 9/1981 | Mattson | F24S 50/80 |
| | | | 126/678 |
| 10,355,156 B2 * | 7/2019 | Horimai | H01L 31/0547 |
| 2008/0291541 A1 | 11/2008 | Padiyath et al. | |
| 2011/0074808 A1 | 3/2011 | Huang et al. | |
| 2011/0075245 A1 | 3/2011 | Hashimura et al. | |
| 2011/0109659 A1 | 5/2011 | Tang et al. | |
| 2011/0109821 A1 | 5/2011 | Tang et al. | |
| 2011/0109845 A1 | 5/2011 | Tang et al. | |
| 2011/0109854 A1 | 5/2011 | Tang et al. | |
| 2011/0109870 A1 | 5/2011 | Tang et al. | |
| 2011/0109956 A1 | 5/2011 | Hashimura et al. | |
| 2012/0139958 A1 | 6/2012 | Tang et al. | |
| 2012/0200817 A1 | 8/2012 | Tweet et al. | |
| 2012/0262778 A1 | 10/2012 | Hashimura et al. | |
| 2012/0287362 A1 | 11/2012 | Hashimura et al. | |
| 2012/0313860 A1 | 12/2012 | Hashimura et al. | |
| 2013/0077036 A1 | 3/2013 | Hashimura et al. | |
| 2013/0258456 A1 | 10/2013 | Hashimura et al. | |
| 2013/0333693 A1 * | 12/2013 | Hashimura | H01L 31/0547 |
| | | | 126/714 |
| 2014/0168742 A1 | 6/2014 | Hashimura et al. | |
| 2015/0063748 A1 | 3/2015 | Zhang | |
| 2016/0079462 A1 * | 3/2016 | Peng | H01L 31/0547 |
| | | | 136/246 |
| 2016/0369962 A1 | 12/2016 | Padiyath et al. | |

FOREIGN PATENT DOCUMENTS

| | | |
|---|---|---|
| JP | 2002-517707 A | 6/2002 |
| JP | 4247301 B1 | 4/2009 |
| JP | 2009-300037 A | 12/2009 |
| JP | 2010-527815 A | 8/2010 |
| JP | 2012-206920 A | 10/2012 |
| WO | 99/64795 A2 | 12/1999 |
| WO | 2007/026311 A1 | 3/2007 |
| WO | 2014/178184 A1 | 11/2014 |

* cited by examiner

SOLAR LIGHT UTILIZATION APPARATUS AND SOLAR LIGHT UTILIZATION SYSTEM

CROSS REFERENCE TO RELATED APPLICATIONS

This application is a continuation of PCT application No. PCT/JP2018/012613, which was filed on Mar. 27, 2018 based on Japanese patent application 2017-073447 filed on Apr. 3, 2017, whose contents are incorporated herein by reference. Also, all the references cited herein are incorporated as a whole.

BACKGROUND OF THE INVENTION

1. Technical Field

The present invention relates to a solar light utilization apparatus and a solar light utilization system.

2. Background Art

In the related art, there is known a solar collector having a plurality of vacuum tubes which heat a heat medium by thermal energy obtained by taking solar energy. In addition, in such a solar collector, the number of vacuum tubes is preferably small from viewpoints of costs, heat capacity, and heat dissipation. Therefore, it was proposed to provide a reflection plate having a compound parabolic reflection surface (hereinafter referred to as CPC) on a back surface of a heat collection object such as a vacuum tube (see Patent Literature PCT Japanese Translation Patent Publication No. 2002-517707). By disposing such a CPC, solar light which has slipped between the heat collection objects can be caused to reach the heat collection objects by reflection of the reflection surface including compound paraboloids, and a distance between the heat collecting objects, for example, in a case of the vacuum tubes can be expanded to approximately 5 times a diameter thereof. That is, it is possible to contribute to a reduction in the number of vacuum tubes and the like.

SUMMARY

However, when CPC is disposed as described in Patent Literature PCT Japanese Translation Patent Publication No. 2002-517707, the distance between vacuum tubes is limited to approximately 1.5 times, and it is difficult to reduce the number more than this. For example, when it is desired to widen the distance between the vacuum tubes 1.5 times or more, the CPC becomes tall enough to get in between vacuum tubes. Therefore, the CPC becomes like an eave and an angle range in which light can be directly received becomes narrowed. In addition, since the CPC becomes tall, there is a possibility that a thickness thereof as a whole may increase.

This problem is not limited to a vacuum tube type heat collection unit, and is common to, for example, a slat-like heat collection unit, and is also not limited to the heat collection unit and is common to a solar cell panel or a hybrid solar panel (PVT) having both the heat collection unit and the solar cell panel. That is, the problem is common to various solar light utilization devices that capture and use solar energy.

The present invention was made to solve such a problem, and an object thereof is to provide a solar light utilization apparatus and a solar light utilization system which are capable of further increasing a distance between solar light utilization devices while reducing a thickness thereof.

A solar light utilization system according to the present invention captures and utilizes solar energy and includes a plurality of solar light utilization devices which are disposed by extending horizontally and are arranged parallel to each other with a predetermined distance, and a reflection plate having a substantially planar shape. The reflection plate is provided on an opposite side of the sun with respect to the plurality of solar light utilization devices, and reflects solar light. The reflection plate includes a reflection surface having a serrated section at a corresponding position between solar light utilization devices adjacent to each other, and one face of a serration forms a first reflection surface that reflects the solar light to one of the solar light utilization devices adjacent to each other.

According to the present invention, by using a reflection plate having a substantially planar shape, including a first reflection surface that reflects solar light to one of solar light utilization devices adjacent to each other, it is possible to irradiate the solar light utilization device again with the solar light that has passed between the solar light utilization devices. Moreover, since the reflection plate has the planar shape, the reflection plate does not become tall enough to get in between solar light utilization devices. It is possible to prevent the reflection plate from becoming like an eave and the range of angles that can directly receive light from being narrowed. Furthermore, since the reflection plate does not become tall, it is possible to contribute to a reduction in thickness. Accordingly, it is possible to provide a solar light utilization apparatus capable of further increasing a distance between solar light utilization devices while reducing a thickness thereof.

BRIEF DESCRIPTION OF THE DRAWINGS

FIG. 3A shows a state of reflection by a first reflection surface, and FIG. 3B shows a state of reflection by a second reflection surface.

DETAILED DESCRIPTION OF EMBODIMENTS

Hereinafter, the present invention will be described in accordance with a preferred embodiment. The present invention is not limited to embodiments shown below and appropriate modifications can be made within the scope not departing from the gist of the present invention. In embodiment shown below, although there is a case where illustration or description of a part of a configuration is omitted, it is needless to say that, in details of the omitted technique, appropriately known or well-known techniques are applied within a range not inconsistent with the contents described below.

Figure 1:
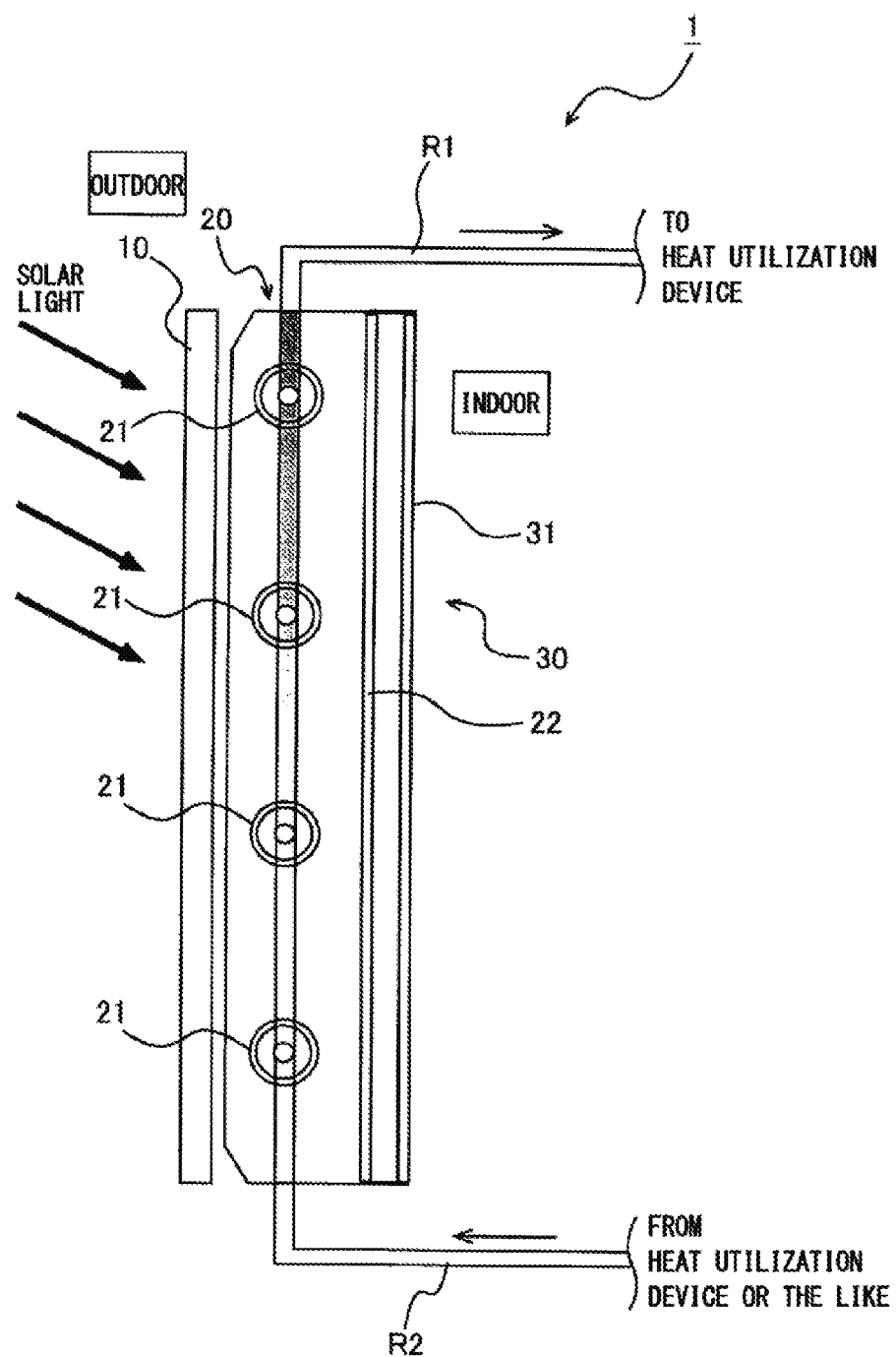
FIG. 1 is a configuration view showing a solar light utilization system including a solar light utilization apparatus according to an embodiment of the present invention.

FIG. 1 is a configuration view showing a solar light utilization system including a solar light utilization apparatus according to an embodiment of the present invention. Although FIG. 1 shows an example in which the solar light utilization system is used in a middle floor of a building such as a high-rise building, the solar light utilization system is not limited a case of being used in the middle floor of the building. The solar light utilization system may be used for an upper floor and a lower floor, or may be used for a single-family house. Furthermore, although FIG. 1 illustrates an example in which the solar light utilization apparatus is used in an elevation state, the present invention is not limited thereto. The solar light utilization apparatus may be used in a slope state or may be used in a planar state. In addition, although the solar light utilization apparatus shown in FIG. 1 is used for a window surface, it is not limited thereto. The solar light utilization apparatus may also be used on a roof, ground, and the like, as an existing solar collection panel and the like. In particular, when a solar light utilization system 1 is used on a roof, the ground, and the like, there is no equivalent to an outer glass 10 to be described later, and a plurality of vacuum tubes 21 to be described later may be exposed.

The solar light utilization system 1 according to the example shown in FIG. 1 is provided on an inner side of the outer glass 10 of the building, and includes a solar collector (solar light utilization apparatus) 20 and a multilayer heat insulation unit 30, first and second pipes R1 and R2, and a heat utilizing device (not shown).

The outer glass 10 is a plate-like glass member installed in the building, and is preferably a transmissive glass having a transmittance of 80% or more of natural light. The outer glass 10 is not limited to the transmissive glass, and may be a heat ray absorption glass or a heat ray reflection glass installed in an existing high-rise building. The outer glass 10 is a part of a construction and withstands wind pressure and meets a building standard. In addition, the solar light utilization system 1 is not limited to the outer glass 10, and may be provided inside a transparent portion (such as a transparent resin material).

The solar collector 20 obtains thermal energy by using solar energy supplied to an indoor side via the outer glass 10, and heats an object to be heated with the thermal energy obtained using the solar energy. In the present embodiment, the object to be heated is, for example, a gas such as air or a heat medium (antifreeze such as ethylene glycol). The solar collector 20 has a horizontal blind structure including a plurality of vacuum tubes (solar light utilization devices) 21 extending in a horizontal direction.

The plurality of vacuum tubes 21 capture and utilize the solar energy for heating the object to be heated, and are disposed parallel to each other and with a predetermined distance. Each of the plurality of vacuum tubes 21 includes an outer tube having transparent color and an inner tube subjected to selective absorption processing of the solar light. For example, the vacuum tube has a configuration to heat the gas or the heat medium flowing in a U-shaped flow passage inserted into the inner tube.

The solar collector 20 is not limited to a vacuum tube type including the plurality of vacuum tubes 21, and may be another type including a heat collecting fin. Also, still another type may be used. Furthermore, the solar collector 20 may include a solar power generation panel (that obtains electrical energy by using solar energy) or a PVT including both a collecting unit and solar cell panel, in place of the plurality of vacuum tubes 21.

Furthermore, the solar collector 20 includes a reflection plate 22 having a substantially planar shape, which reflects solar light on an opposite side (that is, on an indoor side) of the sun with respect to the plurality of vacuum tubes 21. The reflection plate 22 reflects solar light that has passed between the plurality of vacuum tubes 21 to irradiate the vacuum tube 21 again with the solar light.

The multilayer heat insulation unit 30 performs heat insulation between the indoor side and the outdoor side, and includes an inner glass (a transparent plate material) 31. In the present embodiment, the multilayer heat insulation unit 30 has a configuration combined with the reflection plate 22 of the solar collector 20, and is a member having a bilayer structure having a space sandwiched by the reflection plate 22 and the inner glass 31.

An upper part of the solar collector 20 is connected to the first pipe R1. The air or the heat medium heated by the solar collector 20 is supplied to the heat utilization device through the first pipe R1 The heat utilization device (not shown) is, for example, a fan that supplies the air heated by the solar collector 20 into a room, or an absorption refrigerator that performs cooling using the heat medium heated by the solar collector 20. A lower part of the solar collector 20 is connected to the second pipe R2. The second pipe R2 is a flow path through which the heat medium or indoor air is introduced from the heat utilization device.

Figure 2:
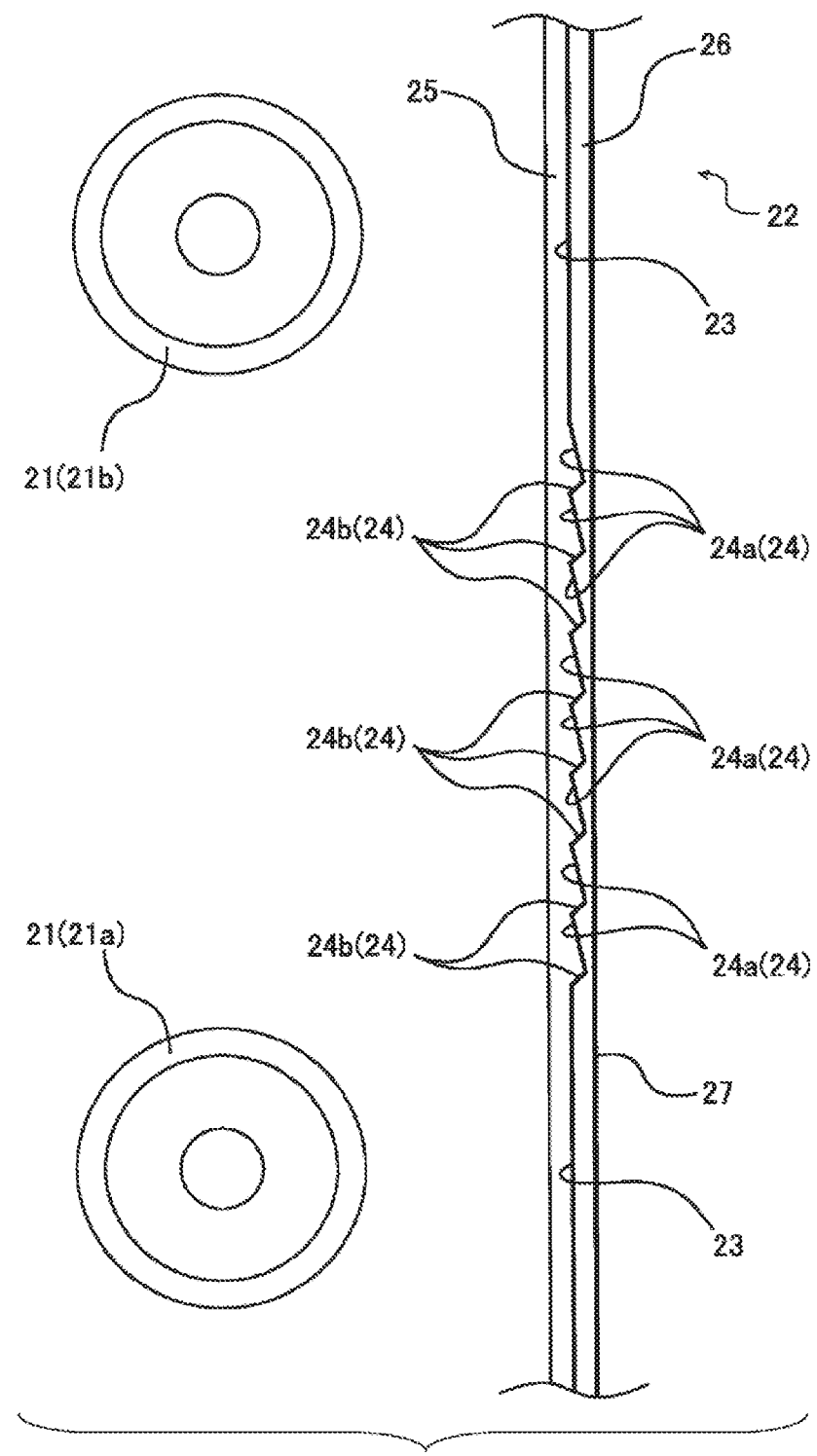
FIG. 2 is an enlarged view of a reflection plate shown in FIG. 1.

FIG. 2 is an enlarged view of the reflection plate 22 shown in FIG. 1. As shown in FIG. 2, in the present embodiment, the reflection plate 22 of the solar collector 20 includes a reflection member 23, a first transparent member 25, and a second transparent member 26.

The reflection member 23 is a portion that reflects solar light. In the present embodiment, a reflection surface 24 having a serrated section is formed at a corresponding portion between the vacuum tubes 21 adjacent to each other. In the reflection members 23, an indoor side (that is, a back side) of the vacuum tube 21 is a planar reflection surface, but there is no limitation thereto. The indoor side may be a serrated section as in the reflection surface 24.

Specifically, the reflection surface 24 has a structure which includes a first reflection surface 24a facing slightly downward in the elevation state and a second reflection surface 24b facing slightly upward in the elevation state, and in which the first reflection surface 24a and the second reflection surface 24b are repeated continuously. That is, the reflection surface 24 has a structure in which the first reflection surface 24a and the second reflection surface 24b form one group, and a plurality of the groups are regularly arranged continuously.

In the present embodiment, a length of one group in a vertical direction (one tooth) including the first reflection surface 24a and the second reflection surface 24b is on the micron order or nano order (specifically, 1 nm or more and less than 1 mm). Here, in the present embodiment, although the length in the vertical direction is used, it is needless to say that when the solar collector 20 is used on a slope or a plane, the length in a direction thereof is used. That is, a length in a plane direction of the reflection plate 22 and a direction orthogonal to a direction in which the vacuum tube 21 extends is used.

The first reflection surface 24a forms one face of a serration in a sectional view, and has an angle setting to reflect the solar light to a vacuum tube 21a on a lower side among the vacuum tubes 21 adjacent to each other in upper and lower sides. Furthermore, the second reflection surface 24b forms the other face of the serration in a sectional view, and has an angle setting to reflect the solar light to a vacuum tube 21b on an upper side among the vacuum tubes 21 adjacent to each other in the upper and lower sides.

In particular, the first reflection surface 24a is at an angle that does not substantially inhibit the solar light reflected by the second reflection surface 24b from reaching the upper vacuum tube 21b. Similarly, the second reflection surface 24b is also at an angle that does not inhibit the solar light reflected by the first reflection surface 24a from reaching the vacuum tube 21a on a lower side.

More specifically, the daily maximum solar altitude (meridian transit altitude in Japan) fluctuates depending on the season (hereinafter, the daily maximum solar altitude is simply referred to as the solar altitude). Therefore, the reflection surface 24 is designed such that the vacuum tubes 21a and 21b are irradiated with solar light both at the highest and lowest altitudes by the first reflection surface 24a and the second reflection surface 24b.

Figure 3A:
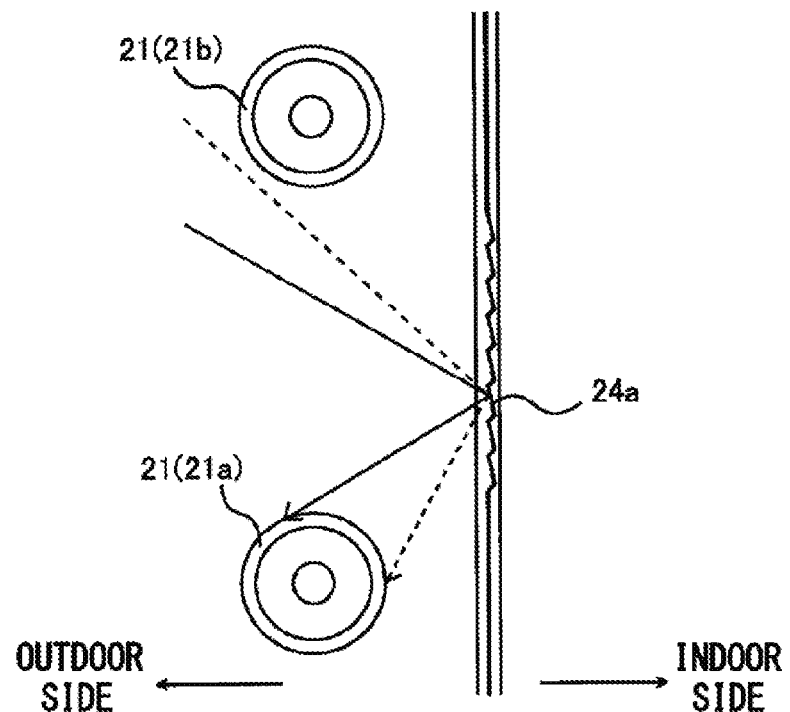
FIGS. 3A and 3B are side views showing a state of reflection of solar light by a reflection surface shown in FIG. 2.
Figure 3B:
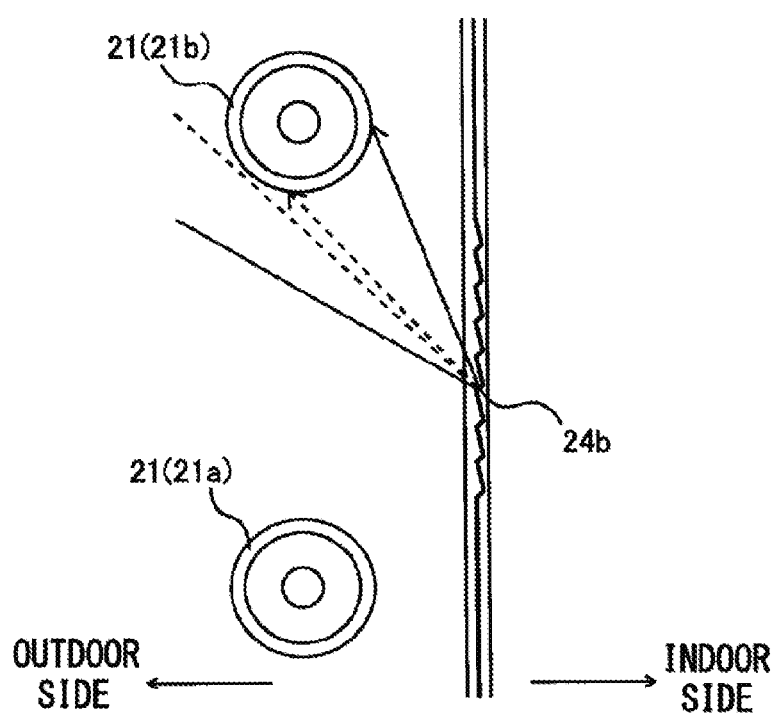

FIGS. 3A and 3B are side views showing a state of reflection of solar light by the reflection surface 24 shown in FIG. 2. FIG. 3A shows a state of reflection by the first reflection surface 24a. FIG. 3B shows a state of reflection by the second reflection surface 24b. In FIGS. 3A and 3B, a broken line shows the solar light at the highest solar altitude, and a solid line shows the solar light at the lowest solar altitude.

First, as shown in FIG. 3A, the first reflection surface 24a reflects the solar light toward the vacuum tube 21a on the lower side. In this case, the first reflection surface 24a is designed to reflect the solar light at the highest solar altitude toward a portion on the indoor side in the vacuum tube 21a on the lower side. Also, the first reflection surface 24a is designed to reflect the solar light at the lowest solar altitude toward a portion on the outdoor side in the vacuum tube 21a on the lower side.

In addition, as shown in FIG. 3B, the second reflection surface 24b reflects the solar light toward the vacuum tube 21b on the upper side. In this case, the second reflection surface 24b is designed to reflect the solar light at the highest solar altitude toward a portion on the outdoor side in the vacuum tube 21b on the upper side. Also, the second reflection surface 24b is designed to reflect the solar light at the lowest solar altitude toward a portion on the indoor side in the vacuum tube 21b on the upper side.

The first reflection surface 24a may be designed so that some solar light deviates, as long as the solar light is reflected to hit the vacuum tube 21a on the lower side roughly when the solar altitude is the highest or the lowest. Similarly, the second reflection surface 24b may be designed so that some solar light deviates, as long as the solar light is reflected to hit the vacuum tube 21b on the upper side roughly when the solar altitude is the highest or the lowest. In addition, in the present embodiment, although it is assumed that the first and second reflection surfaces 24a and 24b are configured by one plane, the first and second reflection surfaces 24a and 24b may be configured by two or more planes or have some curved surface structures. In addition, in the present embodiment, although it is assumed that the plurality of first reflection surfaces 24a all have the same angle settings, there is no limitation thereto. Each of the first reflection surfaces 24a may have a different angle setting. Similarly, each of the second reflection surfaces 24b may have different angle setting.

In addition, in the present embodiment, since the solar collector 20 is used on the window surface, it is preferable that the reflection member 23 transmits, for example, a predetermined amount of visible light (specifically, 20% or more and less than 40%, particularly 30%) and reflects the rest thereof. This is because when used as a window surface, visibility of an external scenery or the like can be secured to some extent, as long as the visible light is transmitted by 20% or more. In addition, it is preferable to reflect 90% or more of infrared rays. By using this reflection member 23, approximately 70% of visible light that occupies approximately 52% of solar light and 90% or more of infrared radiation that occupies approximately 42% of energy will be reflected. This makes it possible to prevent the visibility of an outside scenery from greatly decreasing while allowing 74% or more of the energy to reach the vacuum tube 21 in total. This reflection member 23 is known as a heat ray selective reflection film or the like, and can be realized by application of metal nanotabular particles or a dielectric multilayer film in which dielectrics having different refractive indexes are laminated in multiple layers.

FIG. 2 is referred to again. A first transparent member 25 of the reflection plate 22 is configured of a transparent film in which one surface is a serrated section and the other surface is planar. The reflection member 23 is formed on a side of one surface of the first transparent member 25 and the other surface to be planar of the first transparent member 25 is disposed facing a side of the plurality of vacuum tubes 21. Therefore, dust is less likely to be accumulated on the reflection plate 22 on the side of the vacuum tube 21 and frequency of cleaning is reduced. Therefore, a structure in which a possibility of damaging the vacuum tube 21 at the time of cleaning is reduced is obtained. The solar light utilization system 1 according to the present embodiment is provided on an inner side of the outer glass 10. However, in particular, since dust is more likely to be collected, it is more effective for a case where there is no equivalent to the outer glass 10 and the vacuum tube 21 is exposed, such as a case of being used for a roof.

In addition, the second transparent member 26 of the reflection plate 22 is configured of a transparent film in which one surface has a shape matching the reflection surface 24 (reflection member 23) having the serrated section to be provided on the reflection surface 24 (reflection member 23) and the other surface is planar. Furthermore, the second transparent member 26 is formed of a resin having the same refractive index as the first transparent member 25. Therefore, since both surfaces of the reflection plate 22 are planar and the refractive indexes of the transparent members 25 and 26 are the same as each other, visible light which passes through the reflection member 23 does not refract due to the difference in refractive index between the first transparent member 25 and the second transparent member 26, and the outside scenery can be made visible like the window glass.

In addition, in the present embodiment, the reflection plate 22 is subjected to far-infrared cut processing, by coating the side on the other surface (that is, the indoor side) of the second transparent member 26 with a metal film 27. It is not limited to the case where coating is performed with the metal film 27, and the far-infrared cut processing may be performed by another method. This is because heat from the indoor side can be made more difficult to escape to the outside by radiation.

The far-infrared cut processing is processing in which all absorbance or emissivity and transmissivity of far infrared rays in at least a wavelength of 9 μm to 10 μm are set to 20% or less. Since the far-infrared cut processing is performed to the reflection plate 22, the far-infrared cut processing may not need to be performed to the inner glass 31. For example, sum of the absorbance or emissivity and the transmissivity to the far-infrared rays is set to 80% or more.

Next, an operation and an action of the solar light utilization system 1 according to the present embodiment will be described.

First, when solar light is incident on the solar collector 20, the solar collector 20 utilizes the solar energy to heat the heat medium and the like. The heat medium rises due to the heating and reaches the heat utilization device through the first pipe R1. In particular, in the present embodiment, the plurality of vacuum tubes 21 are disposed with a distance of three or more times the diameter thereof. Accordingly, much of solar light passes between the plurality of vacuum tubes 21. However, the solar light that has passed is reflected on the reflection surface 24 to the vacuum tubes 21 adjacent to each other in the upper and lower sides. Therefore, the vacuum tube 21 heats up the heat medium or the like efficiently.

In the heat utilization device, indoor heating and cooling are performed by the heat medium or the like. For example, when the heat utilization device is a fan, the air heated by the solar collector 20 is supplied to the room by the fan. In addition, when the heat utilization device is an absorption refrigerator, the heat medium heated by the solar collector 20 is used to regenerate an absorption liquid in the absorption refrigerator, and the room is cooled. Since the far-infrared cut processing is performed on a surface of the reflection plate 22 on the indoor side, the radiation amount of the far-infrared rays from the indoor side to the outdoor side is suppressed at the time of heating.

In this manner, according to the solar collector 20 according to the present embodiment, the reflection plate 22 having a substantially planar shape, which reflects solar light on an opposite side of the sun with respect to the plurality of vacuum tubes 21 is provided, the reflection plate 22 includes the reflection surface 24 having a serrated section at a corresponding position between vacuum tubes 21 adjacent to each other, and in the reflection surface 24, one face of a serration reflects the solar light to the vacuum tube 21a on the lower side. Therefore, by using the reflection plate 22 having the substantially planar shape, it is possible to irradiate the vacuum tube 21 again with the solar light that has passed between the vacuum tubes 21. Moreover, since the reflection plate 22 has the substantially planar shape, the reflection plate 22 does not become tall enough to get in between the vacuum tubes 21. It is possible to prevent the reflection plate 22 from becoming like an eave and the range of angles that can directly receive light from being narrowed. Furthermore, since the reflection plate 22 does not become tall, it is possible to contribute to reduction in a thickness. Accordingly, it is possible to provide the solar collector 20 capable of further increasing a distance between vacuum tubes 21 while reducing a thickness thereof.

In addition, since in reflection surface 24, the other face of the serration forms the second reflection surface 24b which reflects the solar light to the vacuum tube 21b on the upper side, it is possible to irradiate the vacuum tube 21 again with the solar light that has passed between the vacuum tubes 21, by both the first reflection surface 24a and the second reflection surface 24b. Accordingly, it is possible to provide the solar collector 20 capable of further increasing a distance between the vacuum tubes 21.

In addition, since the other surface to be planar of the first transparent member 25 is disposed facing the side of the plurality of vacuum tubes 21, it is possible to easily prevent the reflection efficiency from deteriorating due to the accumulation of dust as in a case of CPC. In particular, in the case of CPC, since dust is accumulated, it is necessary to put a hand into a narrow gap between the vacuum tube 21 and the CPC when dropping the dust and there is also a possibility of damaging the vacuum tube 21. However, in the present embodiment, such a possibility can also be reduced.

In addition, since the second transparent member 26 in which one surface has a shape matching the reflection surface 24 having the serrated section and the other surface is planar, which has the same refractive index as the first transparent member 25 is further provided, both surfaces of the reflection plate 22 are planar. Furthermore, since the reflection surface 24 transmits a predetermined amount of visible light, the transmitted visible light can be introduced in the same manner as the window glass, and it is possible to suppress the visibility of an external scenery or the like from deteriorating. In particular, when the CPC is used for the window glass or the like, it is necessary to form a mesh-like punched hole in the CPC. However, even in this case, the CPC is confirmed by the user, and the visibility of the external scenery or the like greatly deteriorates. However, in a case of the above configuration, such a problem does not occur, and it is possible to suppress visibility of the external scenery or the like from deteriorating.

Furthermore, since fine pattern in which a length in one tooth of the serrated section is a micron order or a nano order is formed, the view is clearer and the composite film can be made thinner. In addition, it becomes possible to mass-produce inexpensively by nanoimprint technology.

In addition, according to the solar light utilization system 1 according to the present embodiment, since the multilayer heat insulation unit 30 formed of the reflection plate 22 of the solar collector 20 and the inner glass 31 is provided, the reflection plate 22 can be commonly used with the multilayer heat insulation unit 30. Also, since the reflection plate 22 is subjected to the far-infrared cut processing on the indoor side, heat from the indoor side can be made more difficult to escape to the outside by radiation and it is possible to provide the multilayer heat insulation unit 30 excellent in heat insulation.

Hereinbefore, the present invention has been described based on embodiments. However, the present invention is not limited to the embodiments described above, modifications can be added in a range not departing from the gist of the present invention, and other techniques may be combined as appropriate as far as possible. Furthermore, known or well-known techniques may be combined as far as possible.

For example, in the present embodiment, although the example of using the solar collector 20 on the window surface was described, it is not limited thereto. The collector 20 may be used on a roof, veranda, the ground, and the like and is also not limited to an elevation state and may be used in a slope state or in a planar state. In particular, when used on the roof, the veranda, the ground, and the like, there is no transparent member equivalent to the outer glass 10, and the vacuum tubes 21 may be in a form of being exposed.

Further, in the present embodiment, since the solar collector 20 is used on the window surface, the reflection member 23 transmits a predetermined amount of visible light. However, when used on the roof and the like, the solar collector 20 may be configured such that the solar light is substantially totally reflected. Furthermore, in the present embodiment, although a heat ray selective reflection film or the like is adopted as the reflection plate 22, it is not limited thereto and the reflection plate 22 may be configured by vapor deposition or the like of a metal film. In addition, when using the solar collector 20 on the roof, a configuration of the second transparent member 26 may be omitted.

In addition, in order to cope with the problem of dust, although the reflection plate 22 is planar on the side of the plurality of vacuum tubes 21. However, in a case where dust is not easily accumulated by another method (such as performing super-hydrophilic treatment to drain dust using rainwater), in particular, the plurality of vacuum tubes 21 may not be planar. For example, the first transparent member 25 may be omitted from the reflection plate 22 shown in FIG. 2.

In addition, in the present embodiment, although both the first and second reflection surfaces 24a and 24b reflect the solar light to the vacuum tubes 21 on the upper and lower sides, it is not limited thereto. The first reflection surface 24a reflects the solar light only to one of the vacuum tubes 21 on the upper and lower sides and the second reflection surface 24b may be configured to not function (that is, reflecting no solar light or even reflecting, not to reflect to the vacuum tube 21). Even in this configuration, it is possible to achieve a distance of 1.5 times or more the diameter of the vacuum tube 21 which is the limit of the current CPC.

Also, the reflection member 23 may have the reflection surface 24 having the serrated section over an entire area. Furthermore, the reflection surface 24 is not limited to a case where one tooth is on micro order or nano order, and may have a larger size.

In addition, in the embodiment, the inner glass 31 and the outer glass 10 are not limited to a configuration made of so-called glass materials, and may be made of a transparent member containing a transparent resin such as polycarbonate.

In addition, the solar light utilization system 1 is not limited to the above-described heat utilization device such as the fan or the absorption refrigerator, and another heat utilization device may be employed.

In addition, in the embodiment, although the multilayer heat insulation unit 30 has a configuration in which some configurations (reflection plate 22) is combined with the solar collector 20, in particular a transparent plate material may be provided separately from the reflection plate 22 and may have a bilayer structure of the transparent plate material and the inner glass 31 without using in combination. Furthermore, the multilayer heat insulation unit 30 may have a structure of three or more layers.

Here, the features of the solar light utilization apparatus and the solar light utilization system according to the embodiment of the present invention described above are briefly summarized and listed in the following [1] to [6].

[1] A solar light utilization apparatus (solar collector 20) that captures and utilizes solar energy, including:
a plurality of solar light utilization devices (vacuum tubes 21, 21a, and 21b) which extend horizontally and are arranged parallel to each other with a predetermined distance; and
a reflection plate (22) having a substantially planar shape, which is provided on an opposite side of the sun with respect to the plurality of solar light utilization devices and reflects solar light, in which
the reflection plate includes a reflection surface having a serrated section at a corresponding position between solar light utilization devices adjacent to each other and also having a planar reflection surface at a portion corresponding to a back side of the solar light utilization devices, and
in the reflection surface, one face of a serration forms a first reflection surface (24a) that reflects the solar light to one of the solar light utilization devices adjacent to each other.

[2] The solar light utilization apparatus according to [1], in which
in the reflection surface, the other face of the serration forms a second reflection surface (24b) that reflects the solar light to the other one of the solar light utilization devices adjacent to each other.

[3] The solar light utilization apparatus according to [1], in which
the reflection plate includes a first transparent member (25) in which one surface has serrated in section and the other surface is planar, in which the reflection surface is formed on a side of the one surface of the first transparent member and the other surface to be planar of the first transparent member is disposed, facing a side of the plurality of solar light utilization devices.

[4] The solar light utilization apparatus according to [3], in which
the reflection plate further includes a second transparent member (26) in which one surface has a shape matching the reflection surface having the serrated section to be provided on the reflection surface, the other surface is planar, a refractive index is the same as the first transparent member, and the reflection surface transmits a predetermined amount of visible light.

[5] The solar light utilization apparatus according to [1], in which
the reflection surface is formed in a fine pattern in which, in one tooth of the serrated section, a length in a direction orthogonal to a parallel direction which is a plane direction of the reflection plate is a micron order or a nano order.

[6] A solar light utilization system (1) including:
the solar light utilization apparatus according to [4], which captures solar energy to heat an object to be heated; and
a multilayer heat insulation unit (30) formed by using the reflection plate of the solar light utilization apparatus and a transparent plate material (inner glass 31), in which
the reflection plate is subjected to far-infrared cut processing on a side of the transparent plate material so that all absorbance or emissivity and transmissivity of far infrared rays in at least a wavelength of 9 µm to 10 µm are 20% or less.

While the present invention has been described in detail and with reference to specific embodiments, it will be apparent to those skilled in the art that various changes and modifications can be made therein without departing from the spirit and scope of the present invention.

According to the present invention, there is an effect that it is possible to provide a solar light utilization apparatus and a solar light utilization system which are capable of further increasing a distance between solar light utilization devices while reducing a thickness thereof. The present invention having the effect is useful for a solar light utilization apparatus and a solar light utilization system installed on a building, a roof, or the ground.

What is claimed is:

1. A solar light utilization apparatus that captures and utilizes solar energy, comprising:
a plurality of solar light utilization devices which extend horizontally and are arranged parallel to each other with a predetermined distance; and
a reflection plate having a substantially planar shape, which is provided on an opposite side of the sun with respect to the plurality of solar light utilization devices and reflects solar light, wherein
the reflection plate includes a reflection surface having a serrated section at a corresponding position between solar light utilization devices adjacent to each other and also having a planar reflection surface at a portion corresponding to a back side of the solar light utilization devices, in the reflection surface, one face of a serration forms a first reflection surface that reflects the solar light to one of the solar light utilization devices adjacent to each other, and the reflection plate includes a first non-serrated section and a second non-serrated section, the serrated section is located between and abuts each of the first and second non-serrated sections, and each of the first and second non-serrated sections opposes a respective one of the solar light utilization devices.

2. The solar light utilization apparatus according to claim 1, wherein in the reflection surface, the other face of the serration forms a second reflection surface that reflects the solar light to the other one of the solar light utilization devices adjacent to each other.

3. The solar light utilization apparatus according to claim 1, wherein the reflection plate includes a first transparent member in which one surface has serrated in section and the other surface is planar, in which the reflection surface is formed on a side of the one surface of the first transparent member and the other surface to be planar of the first transparent member is disposed, facing a side of the plurality of solar light utilization devices.

4. The solar light utilization apparatus according to claim 3, wherein the reflection plate further includes a second transparent member in which one surface has a shape matching the reflection surface having the serrated section to be provided on the reflection surface, the other surface is planar, a refractive index is the same as the first transparent member, and the reflection surface transmits a predetermined amount of visible light.

5. The solar light utilization apparatus according to claim 1, wherein the reflection surface is formed in a fine pattern in which, in one tooth of the serrated section, a length in a direction orthogonal to a parallel direction which is a plane direction of the reflection plate is a micron order or a nano order.

6. A solar light utilization system comprising:

the solar light utilization apparatus which captures solar energy to heat an object to be heated, the solar light utilization apparatus comprising:

a plurality of solar light utilization devices which extend horizontally and are arranged parallel to each other with a predetermined distance; and a reflection plate having a substantially planar shape, which is provided on an opposite side of the sun with respect to the plurality of solar light utilization devices and reflects solar light, wherein the reflection plate includes a reflection surface having a serrated section at a corresponding position between solar light utilization devices adjacent to each other and also having a planar reflection surface at a portion corresponding to a back side of the solar light utilization devices, in the reflection surface, one face of a serration forms a first reflection surface that reflects the solar light to one of the solar light utilization devices adjacent to each other, wherein the reflection plate includes a first transparent member in which one surface has serrated in section and the other surface is planar, in which the reflection surface is formed on a side of the one surface of the first transparent member and the other surface to be planar of the first transparent member is disposed, facing a side of the plurality of solar light utilization devices, and wherein the reflection plate further includes a second transparent member in which one surface has a shape matching the reflection surface having the serrated section to be provided on the reflection surface, the other surface is planar, a refractive index is the same as the first transparent member, and the reflection surface transmits a predetermined amount of visible light; and a multilayer heat insulation unit formed by using the reflection plate of the solar light utilization apparatus and a transparent plate material, and wherein the reflection plate is subjected to far-infrared cut processing on a side of the transparent plate material so that all absorbance or emissivity and transmissivity of far infrared rays in at least a wavelength of 9 μm to 10 μm are 20% or less.

* * * * *